(12) United States Patent
Lin et al.

(10) Patent No.: US 11,345,467 B2
(45) Date of Patent: May 31, 2022

(54) DATA TRANSMISSION METHOD, AND SENDING END DEVICE

(71) Applicant: Guangdong Oppo Mobile Telecommunications Corp., Ltd., Guangdong (CN)

(72) Inventors: Shangbo Lin, Guangdong (CN); Shiming Wan, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 168 days.

(21) Appl. No.: 16/480,155

(22) PCT Filed: Apr. 3, 2018

(86) PCT No.: PCT/CN2018/081780
§ 371 (c)(1),
(2) Date: Jul. 23, 2019

(87) PCT Pub. No.: WO2018/184536
PCT Pub. Date: Oct. 11, 2018

(65) Prior Publication Data
US 2019/0372404 A1 Dec. 5, 2019

(30) Foreign Application Priority Data

Apr. 7, 2017 (WO) ............... PCT/CN2017/079786

(51) Int. Cl.
*H02J 50/80* (2016.01)
*H02J 50/20* (2016.01)
(Continued)

(52) U.S. Cl.
CPC .......... *B64C 27/473* (2013.01); *B64C 11/001* (2013.01); *B64C 27/08* (2013.01);
(Continued)

(58) Field of Classification Search
CPC ..... B64C 27/473; B64C 11/001; B64C 27/08; B64C 27/467; H04W 4/80; H04W 76/10;
(Continued)

(56) References Cited

U.S. PATENT DOCUMENTS 8,099,537 B2 *  1/2012  Suenaga ............. H04L 25/14
                                                710/106
8,359,358 B2 *  1/2013  Bai .................. G06F 16/178
                                                709/206
(Continued)

FOREIGN PATENT DOCUMENTS

CN    101217295 A    7/2008
CN    101877604 A    11/2010
(Continued)

OTHER PUBLICATIONS

PDF translation of Description of CN106302589A from Espacenet.com (Year: 2017).*
(Continued)

*Primary Examiner* — Jared Fureman
*Assistant Examiner* — Michael J Warmflash
(74) *Attorney, Agent, or Firm* — Young Basile Hanlon & MacFarlane, P.C.

(57) ABSTRACT

A data transmission method and a sending end device are provided. The method is applied to short-range wireless communication based on a high carrier frequency. During the process of a sending end device sending data to be transmitted to a receiving end device, the method includes: after short-range wireless communication interrupted between the sending end device and the receiving end device is restored, the sending end device querying recorded transmission information, wherein the transmission information is used to indicate a data block, transmission of which is not completed, in the data to be transmitted; and the sending end
(Continued)

200 after short-range wireless communication interrupted between the sending end device and the receiving end device is restored, the sending end device querying recorded transmission information, wherein the transmission information is used to indicate a data block, transmission of which is not completed, in the data to be transmitted ~ S210 the sending end device sending, to the receiving end device, the data block, transmission of which is not completed, in the data to be transmitted ~ S220 device sending, to the receiving end device, the data block, transmission of which is not completed, in the data to be transmitted.

16 Claims, 3 Drawing Sheets

(51) Int. Cl.

| | | |
|---|---|---|
| *G06F 11/14* | (2006.01) | |
| *H04B 5/00* | (2006.01) | |
| *B64C 27/473* | (2006.01) | |
| *B64C 11/00* | (2006.01) | |
| *B64C 27/08* | (2006.01) | |
| *B64C 27/467* | (2006.01) | |
| *H04M 1/72412* | (2021.01) | |
| *H04W 4/80* | (2018.01) | |
| *H04W 76/10* | (2018.01) | |
| *H02J 7/00* | (2006.01) | |
| *H02J 7/02* | (2016.01) | |
| *H02J 50/12* | (2016.01) | |

(52) U.S. Cl.
CPC ........ *B64C 27/467* (2013.01); *G06F 11/1479* (2013.01); *H02J 7/00032* (2020.01); *H02J 7/02* (2013.01); *H02J 50/20* (2016.02); *H02J 50/80* (2016.02); *H04B 5/0031* (2013.01); *H04B 5/0037* (2013.01); *H04M 1/72412* (2021.01); *H04W 4/80* (2018.02); *H04W 76/10* (2018.02); *H02J 50/12* (2016.02)

(58) Field of Classification Search
CPC ..... H04W 8/24; H04W 8/245; H02J 7/00032; H02J 7/02; H02J 50/80; H02J 50/20; H02J 50/12; H02J 50/10; H02J 7/00; H02J 7/00034; H04B 5/0037; H04B 5/0031; H04B 5/00; H04M 1/72412; H04M 2250/64; G06F 11/1479; H04L 29/08; H04L 67/06

See application file for complete search history.

(56) References Cited

U.S. PATENT DOCUMENTS

| | | | | |
|---|---|---|---|---|
| 8,432,293 B2* | 4/2013 | Symons | ................ | H02J 50/10 340/854.8 |
| 8,947,042 B2* | 2/2015 | Kirby | .................. | H02J 5/005 320/108 |
| 2008/0285496 A1* | 11/2008 | Fuchs | .................. | H04L 67/06 370/311 |
| 2011/0116470 A1* | 5/2011 | Arora | ................ | H04W 36/0083 370/331 |
| 2011/0320612 A1* | 12/2011 | Oka | ..................... | H04W 4/80 709/227 |
| 2014/0019496 A1* | 1/2014 | Chiu | ..................... | H04L 69/14 707/827 |
| 2015/0137750 A1* | 5/2015 | Kirby | ..................... | G06F 8/65 320/108 |
| 2019/0190321 A1* | 6/2019 | Wan | ................ | H02J 7/007182 |
| 2020/0412180 A1* | 12/2020 | Qiao | .................. | B64C 11/001 |

FOREIGN PATENT DOCUMENTS

| | | | |
|---|---|---|---|
| CN | 102257696 A | | 11/2011 |
| CN | 102915289 A | | 2/2013 |
| CN | 102970107 A | | 3/2013 |
| CN | 103227826 A | | 7/2013 |
| CN | 105743978 A | | 7/2016 |
| CN | 105812456 A | | 7/2016 |
| CN | 106160860 A | | 11/2016 |
| CN | 106302589 A | * | 1/2017 |
| CN | 106302589 A | | 1/2017 |
| JP | H088998 A | | 1/1996 |
| WO | 2006077418 A1 | | 7/2006 |
| WO | 2007125670 A1 | | 11/2007 |
| WO | 2009121057 A2 | | 10/2009 |

OTHER PUBLICATIONS

Communication pursuant to Article 94(3) EPC Examination for EP application 18781042.9 dated Oct. 9, 2020.
Extended European Search Report for European Application No. 18781042.9 dated Feb. 6, 2020.
India Office Action for IN application 201917032699 dated Jan. 22, 2021. (5 pages).
European Search Report for EP Application 18781042.9 dated Feb. 23, 2021. (5 pages).
China Office Action with English Translation for CN Application 201880005118.X dated Feb. 23, 2021. (10 pages).
Communication pursuant to Article 94(3) EPC for EP Application 18781042.9 dated Jul. 14, 2021. (6 pages).
Chinese Third Office Action with English Translation for CN Application 201880005118.X dated Sep. 7, 2021. (17 pages).
Chinese Second Office Action with English Translation for CN Application 201880005118.X dated Jul. 6, 2021. (22 pages).

* cited by examiner

200 — after short-range wireless communication interrupted between the sending end device and the receiving end device is restored, the sending end device querying recorded transmission information, wherein the transmission information is used to indicate a data block, transmission of which is not completed, in the data to be transmitted — S210 the sending end device sending, to the receiving end device, the data block, transmission of which is not completed, in the data to be transmitted — S220

FIG. 6 ns communication based on a high carrier frequency (e.g., 60 GHz) can realize high-speed data wireless transmission, and by placing a sending end device close to an antenna of a receiving end device, connection and communication between the two can be realized. How-

DATA TRANSMISSION METHOD, AND SENDING END DEVICE

CROSS-REFERENCE TO RELATED APPLICATION(S)

This application is a 371 application of International Application No. PCT/CN2018/081780, filed on Apr. 3, 2018, which is based on and claims priority to International Application No. PCT/CN2017/079786, filed on Apr. 7, 2017, the entire contents of both of which are incorporated herein by reference.

TECHNICAL FIELD

The present disclosure relates to a field of short-range wireless communication, and more particularly, to a data transmission method, and a sending end device.

BACKGROUND

The short-range wireless communication based on a high carrier frequency (e.g., 60 GHz) can realize high-speed data wireless transmission, and by placing a sending end device close to an antenna of a receiving end device, connection and communication between the two can be realized. However, in short-range wireless communication, the communication connection between the sending end device and the receiving end device may be interrupted at any time due to accident or artificial reasons, thereby interrupting the file data being transmitted, and the file data needs to be retransmitted after connection is restored, which not only wastes resources but also affects the user experience.

SUMMARY

Embodiments of the present disclosure provide a data transmission method, and a sending end device, which may realize breakpoint continuous transmission between a sending end device and a receiving end device in short-range wireless communication based on high carrier frequency.

In a first aspect, embodiments of the present disclosure provide a data transmission method. The method is applied to the short-range wireless communication based on the high carrier frequency, and during a process in which a sending end device sends data to be transmitted to a receiving end device, the method includes:

after short-range wireless communication interrupted between the sending end device and the receiving end device is restored, the sending end device querying recorded transmission information, wherein the transmission information is used to indicate a data block, transmission of which is not completed, in the data to be transmitted; and the sending end device sending, to the receiving end device, the data block, transmission of which is not completed, in the data to be transmitted.

In a second aspect, embodiments of the present disclosure provide a sending end device, including modules or units that can perform the method in the first aspect or in any optional implementation of the first aspect.

In a third aspect, a sending end device is provided. The sending end device includes a processor, a memory, and a communication interface. The processor is coupled to the memory and communication interface. The memory is configured to store instructions, the processor is configured to execute the instructions, and the communication interface is configured to communicate with other network elements under control of the processor. When the processor executes the instructions stored in the memory, the execution causes the processor to perform the method of the first aspect or any of the possible implementations of the first aspect.

In a fourth aspect, a computer storage medium is provided. The computer storage medium has program codes stored therein, in which the program codes are configured to instruct a computer to execute instructions of the methods described in the above aspects.

In a fifth aspect, a computer program product including instructions is provided. When the computer program product is executed on a computer, the computer is caused to perform the method described above in various aspects.

In a sixth aspect, a short-range wireless communication system is provided. The system includes a sending end device and a receiving end device. The sending end device and the receiving end device are configured to establish short-range wireless communication based on a higher carrier frequency. The sending end device is configured to query recorded transmission information after the short-range wireless communication interrupted between the sending end device and the receiving end device is restored, in which the transmission information is used to indicate a data block, transmission of which is not completed, in the data to be transmitted. The sending end device is further configured to send, to the receiving end device, the data block, transmission of which is not completed, in the data to be transmitted.

DETAILED DESCRIPTION

The technical solutions in embodiments of the present disclosure will be clearly and completely described in the following with reference to the accompanying drawings in the embodiments.

The technical solutions of embodiments of the present disclosure can be applied to short-range wireless communication. When the sending end device approaches the antenna of the receiving end device, the non-contact point-to-point data transmission and communication between the sending end device and the receiving end device can be realized. Meanwhile, high speed data wireless transmission can be realized based on a high carrier frequency (e.g., 60 GHz).

Figure 1:
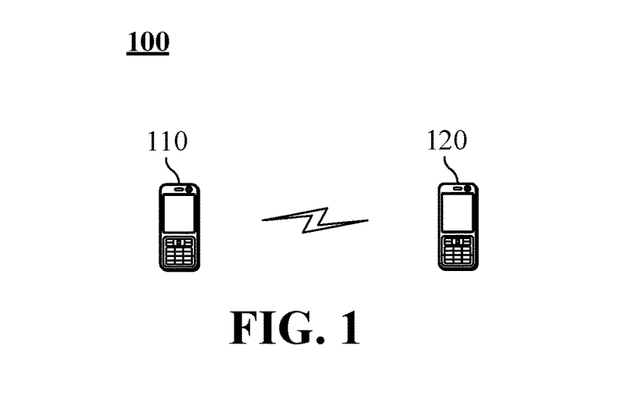
FIG. 1 is a schematic diagram of an application scenario of an embodiment of the present disclosure.

The short-range wireless communication method will be illustrated in FIG. 1.

As illustrated in FIG. 1, the short-range wireless communication system 100 includes the sending end device 110 and the receiving end device 120. The sending end device 110 and the receiving end device 120 can realize non-contact high-speed data transmission. In some embodiments, an extremely high frequency (EHF) antenna is packaged in an integrated circuit (IC) chip of the sending end device 110, and thus, the sending end device 110 can implement high-speed wireless data transmission (e.g., a transmission speed up to 6 GB/s) based on a high carrier frequency (e.g., 60 GHz). In some embodiments, the EHF antenna can also be packaged in the IC chip of the receiving end device 120, so that two-way communication between the sending end device 110 and the receiving end device 120 can be implemented. In some embodiments, wireless data transmission between the sending end device 110 and the receiving end device 120 can be realized by using electromagnetic signals.

It should be understood that the short-range wireless communication based on high carrier frequency has advantages of low power consumption, small size, fast transmission rate, and non-contact transmission, and can also realize the function of the plug-and-play module, which can greatly improve the signal integrity and support implementations of more flexible system, reduce standby power consumption, increase bandwidth amplitude and improve the data transmission security, and can also be compatible with supporting high-speed video signal.

At present, in the short-range wireless communication based on high carrier frequency, the communication connection between the sending end device and the receiving end device may be interrupted at any time due to accident or artificial reasons, thereby interrupting the file data being transmitted, and the file data needs to be retransmitted after connection is restored, which not only wastes resources but also affects the user experience.

In order to solve the above technical problem, embodiments of the present disclosure provide a data transmission method, which can realize the breakpoint continuous transmission between the sending end device and the receiving end device in the short-distance wireless communication based on high carrier frequency.

The technical solutions in the present disclosure will be illustrated in the accompanying drawings.

Figure 2:
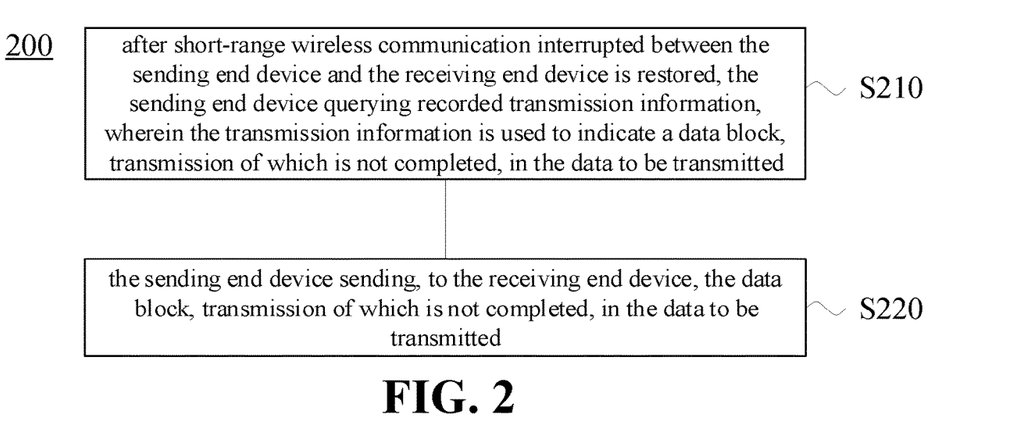
FIG. 2 is a schematic flowchart of a data transmission method according to embodiments of the present disclosure.

FIG. 2 is a schematic flowchart of a data transmission method 200 according to embodiments of the present disclosure. The method 200 is applied to the short-range wireless communication system 100 illustrated in FIG. 1, in the process of the sending end device sending data to be transmitted to the receiving end device. The method 200 includes at least some of the followings.

At block S210, after short-range wireless communication interrupted between the sending end device and the receiving end device is restored, the sending end device queries recorded transmission information, in which the transmission information is used to indicate a data block, transmission of which is not completed, in the data to be transmitted.

It should be understood that, the high carrier frequency may be a carrier frequency capable of realizing high speed wireless data transmission. The high carrier frequency may be an explicit carrier frequency, or may be a carrier frequency band, for example, 30 GHz to 300 GHz, which is not specifically limited in embodiments of the present disclosure.

Preferably, the high carrier frequency is 60 GHz.

In some embodiments, the sending end device includes an IC chip internally packaged with an EHF antenna.

For example, the sending end device includes an independent transmission chip. For example, the independent transmission chip is the IC chip internally packaged with the EHF antenna. The transmission power of the independent transmission chip may be a high frequency of 60 GHz, thereby realizing the high-speed (e.g., 6 GB/s) data transmission between the sending end device and the receiving end device.

In detail, the sending end device queries the recorded transmission information according to the recording table, in which the recording table includes a data block, transmission of which is not completed, in the data to be transmitted and/or a data block that has been completely transmitted in the data to be transmitted.

For example, the sending end device can query the recording table with respect to the receiving end device, or the sending end device can query the recording table corresponding to the identifier of the receiving end device. In this case, the recording table records only the transmission information that the sending end device sends the data to be transmitted to the receiving end device, such that the transmission information recorded can be queried.

For another example, the sending end device can query all the recording tables currently saved, further determine the recording table of the receiving end device, and query the transmission information recorded in the recording table.

It should be understood that, in the process of transmitting the data to be transmitted, the sending end device establishes the recording table corresponding to the identifier of the receiving end device. Every time the sending end device completes sending one data block to the receiving end device, the recording table records that the transmission of the corresponding data block is completed. Therefore, the transmission information can timely reflect the transmission circumstances of the data blocks in the data to be transmitted.

In some embodiments, when the data to be transmitted includes at least one data block, transmission of which is not completed, the sending end device saves the recording table. When the transmission of all the data blocks in the data to be transmitted are completed, the sending end device stops saving the recording table. Therefore, the overhead caused by saving the recording table can be reduced.

It should be understood that the transmission information recorded in the recording table may be the transmission information corresponding to the indexes of the data blocks, or may be the transmission information corresponding to the identifiers of the data blocks, or may be the transmission information corresponding to the numbers of the data blocks, which is not limited in the embodiments of the present disclosure.

For example, in the recording table illustrated in Table 1, the sending end device divides the data to be transmitted into 7 data blocks, the indexes 1-7 respectively being corresponding to 7 data blocks. After the sending end device transmits the data block 1, the data block 2, and the data block 3, the short-range wireless communication connection between the sending end device and the receiving end device is interrupted due to the positional offset or the artificial movement, the transmission of the data to be transmitted is interrupted, and the sending end device saves the recording table. After the short-range wireless communication connection between the sending end device and the receiving end device is restored, the sending end device queries the recording table, thereby determining that the data block 4, the data block 5, the data block 6, and the data block 7 need to be continuously transmitted.

TABLE 1

| Index | whether transmission is completed |
|---|---|
| 1 | Yes |
| 2 | Yes |
| 3 | Yes |
| 4 | No |
| 5 | No |
| 6 | No |
| 7 | No |

For another example, in the recording table illustrated in Table 2, the sending end device divides the data to be transmitted into 7 data blocks, and the indexes 1-7 being corresponding to 7 data blocks respectively, and the sending end device discards the recording table after transmitting all 7 data blocks.

TABLE 2

| Index | whether transmission is completed |
|---|---|
| 1 | Yes |
| 2 | Yes |
| 3 | Yes |
| 4 | Yes |
| 5 | Yes |
| 6 | Yes |
| 7 | Yes |

It should be noted that when the sending end device sends the data to be transmitted to the receiving end device, the sending end device or the receiving end device disconnects the short-range wireless communication connection between the sending end device and the receiving end device due to the positional offset or the artificial cause, and thus the sending end device interrupts the transmission of the data to be transmitted.

Preferably, the data to be transmitted is big data, for example, the number of bits occupied by the transmission data is greater than 20 GB.

In some embodiments, after the short-range wireless communication connection between the sending end device and the receiving end device is established, the sending end device and the receiving end device send the respective unique device identifier to each other, and respectively save the unique device identifier of the opposite end.

Alternatively, the unique identifier may be a media access control (MAC) address, or a combination of the MAC address plus a filed such as a device name, or the like.

It should be noted that, in embodiments of the present disclosure, after determining the data to be transmitted, the sending end device may divide the data to be transmitted into several data blocks. For example, the sending end device may divide the data to be transmitted into several data blocks according to the transmission rate of the sending end device and the transmission rate of the receiving end device, and the transmission duration of each data block is less than or equal to the preset duration. For example, the preset duration may be 1 s. For example, if the wireless transmission rate of the sending end device and/or the receiving end device is 6 G bits per second, then each data block should be less than or equal to 6 G bits.

For example, the sending end device can determine its own transmission rate based on the characteristics of the transmission chip and the wireless communication protocol employed. The sending end device can determine the transmission rate of the receiving end device based on the adopted wireless communication protocol.

It should be understood that the sending end device can divide the data to be transmitted into a plurality of data blocks evenly, and can also randomly divide the data to be transmitted into a plurality of data blocks, which is not limited in the embodiments of the present disclosure.

In some embodiments, before the sending end device queries the recorded transmission information, the sending end device determines that there is data to be transmitted, transmission of which is interrupted, between the sending end device and the receiving end device.

In some embodiments, the sending end device may determine whether there is transmission information corresponding to the identifier of the receiving end device, thus determining whether there is data to be transmitted, transmission of which is interrupted, between the sending end device and the receiving end device.

For example, if the sending end device determines that there is transmission information corresponding to the identifier of the receiving end device, the sending end device determines that there is data to be transmitted, transmission of which is interrupted, between the sending end device and the receiving end device. If the sending end device determines that there is no transmission information corresponding to the identifier of the receiving end device, the sending end device determines that there is no data to be transmitted, transmission of which is interrupted, between the sending end device and the receiving end device.

In some embodiments, the sending end device may also directly determine whether there is data to be transmitted, transmission of which is interrupted, between the sending end device and the receiving end device. For example, the sending end device receives the feedback message fed back by the receiving end device indicating that the receiving end device fails to receive the data to be transmitted, and the sending end device determines that there is data to be transmitted, transmission of which is interrupted, between the receiving end device and the sending end device. For another example, when the sending end device fails to send the data to be transmitted, the sending end device may generate indication information indicating that the data to be transmitted is not successfully transmitted, so that the sending end device may determine, according to the indication information, that there is data to be transmitted, transmission of which is interrupted, between the sending end device and the receiving end device.

At block S220, the sending end device sends the data block, transmission of which is not completed, in the data to be transmitted to the receiving end device.

It should be noted that the receiving end device may save the data block a received before the short-range wireless communication is interrupted, and after the short-range wireless communication is restored, the receiving end device receives the data block b, in this case, the receiving end device can merge the data block a with the data block b, to obtain the complete data to be transmitted.

It should also be noted that after the short-range wireless communication that is interrupted between the sending end device and the receiving end device is restored, the risk of being interrupted may also be faced. Therefore, after the short-range wireless communication is restored, the sending end device also needs to update the recording table in real time, that is, every time the sending end device completes sending one data block to the receiving end device, the recording table records that the transmission of the corresponding data block is completed.

In some embodiments, the sending end device is a wireless charging base, and the sending end device wirelessly charges the receiving end device in the process of performing short-range wireless communication between the sending end device and the receiving end device.

It should be understood that the wireless charging is mainly implemented by magnetic coupling (or electromagnetic induction), magnetic resonance or radio waves. Currently, mainstream wireless charging standards include the QI standard, the power matters alliance (PMA) standard, and the alliance for wireless power (A4WP) standard. Both the QI standard and the PMA standard adopt magnetic coupling for wireless charging. The A4WP standard adopts magnetic resonance for wireless charging.

Figure 3:
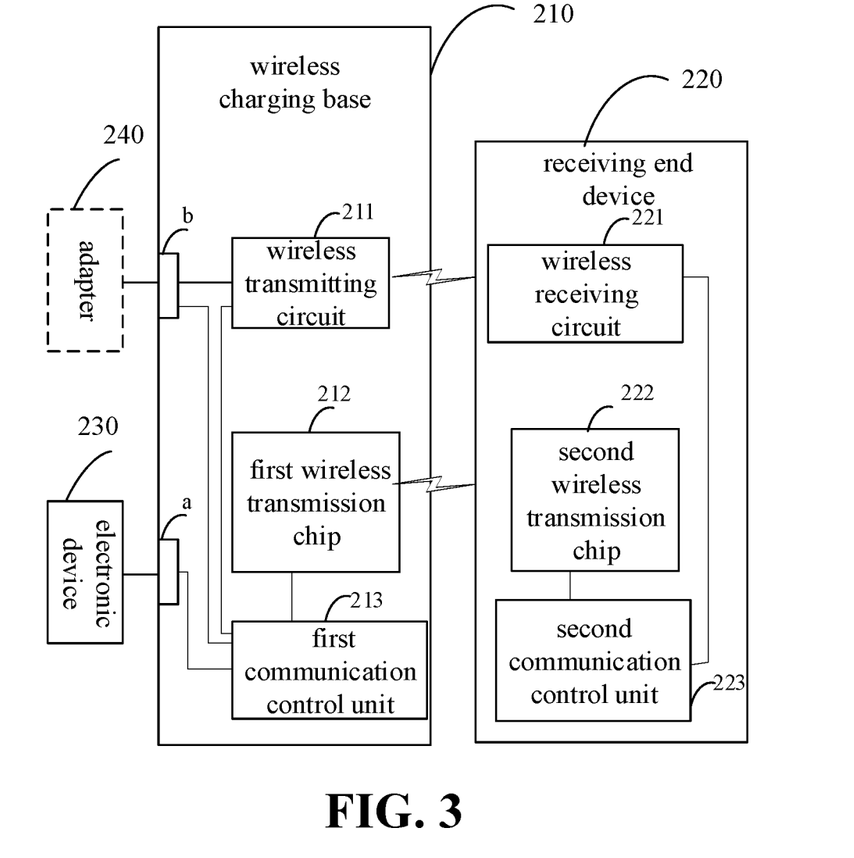
FIG. 3 is a schematic block diagram of a short-range wireless communication system according to embodiments of the present disclosure.

In some embodiments, as illustrated in FIG. 3, the wireless charging base 210 establishes short-range wireless communication with the receiving end device 220, and meanwhile the wireless charging base 210 wirelessly charges the receiving end device 220. After the interrupted short-range wireless communication between the wireless charging base 210 and the receiving end device 220 is restored, breakpoint continuous transmission can be realized between the wireless charging base 210 and the receiving end device 220, and the electronic device 230 can provide data for the wireless charging base 210. The receiving end device 220 may be a device having a wireless charging and wireless transmission function, such as a mobile phone and a tablet, and the electronic device 230 may be a device having data processing and transmission function, such as a computer.

In some embodiments, as illustrated in FIG. 3, the electronic device 230 can also serve as a power supply device of the wireless charging base 210, and can simultaneously provide power and data to the wireless charging base 210 via the external interface a.

In some embodiments, as illustrated in FIG. 3, an adapter 240 can serve as a power supply device for the wireless charging base 210, and can provide power to the wireless charging base 210 via the external interface b.

It should be understood that the external interface a and the external interface b may be the same interface or different interfaces.

In detail, as illustrated in FIG. 3, the power supply device is coupled to the wireless charging base 210 via the external interface, and the wireless charging base 210 converts the output current of the power supply device into an electromagnetic signal (or electromagnetic wave) through the internal wireless transmitting circuit 211 for transmission. For example, the wireless transmitting circuit 211 can convert an output current of the power supply device into an alternating current, and convert the alternating current into the electromagnetic signal through a transmitting coil or a transmitting antenna (not shown). The receiving end device 220 can receive the electromagnetic signal transmitted by the wireless transmitting circuit 211 through the wireless receiving circuit 221 and convert the electromagnetic signal into an output current of the wireless receiving circuit 221. For example, the wireless receiving circuit 221 can convert the electromagnetic signal transmitted by the wireless transmitting circuit 211 into an alternating current through a receiving coil or a receiving antenna (not shown), and perform operations such as rectification and/or filtering on the alternating current to convert the alternating current into an output voltage and an output current of the wireless receiving circuit 221. The output voltage and the output current of the wireless receiving circuit 221 can be used to charge the receiving end device 220 (the battery of the receiving end device 220).

Meanwhile, the electronic device 230 can transmit the data to be transmitted to the wireless charging base 210 through the external interface a, and the first communication control unit 213 in the wireless charging base 210 controls the first wireless transmission chip 212 to transmit the data to be transmitted to the receiving end device 220, and the receiving end device 220 can control the second wireless transmission chip 222 to receive data to be transmitted through the second communication control unit 223. The first communication control unit 213 may include, for example, a micro control unit (MCU) that can generally control the wireless charging process, the wireless data transmission process, and the communication process of the wireless charging base 210. The second communication control unit 223 may be, for example, a central processing unit (CPU) that can generally control the wireless charging process, the wireless data transmission process, and the communication process of the receiving end device 220. The first transmission chip 212 and the second transmission chip 222 may be, for example, an IC chip in which an EHF antenna is internally packaged, and its transmission power may be a high frequency of 60 GHz.

It should be noted that, as illustrated in FIG. 3, after the short-range wireless communication that is interrupted between the wireless charging base 210 and the receiving end device 220 is restored, the wireless charging base 210 can query the recorded transmission information through the first communication control unit 213, and transmit data blocks, transmission of which is not completed, in the data to be transmitted to the receiving end device 220.

It should be understood that the wireless charging base 210 may include a read only memory and/or a random access memory having a specific storage function, so that the transmission information can be recorded.

In the embodiment illustrated in FIG. 3, the receiving end device 220 can also control the second wireless transmission chip 222 to transmit data to the wireless charging base 210 through the second communication control unit 223. In other words, short-range wireless communication between the wireless charging base 210 and the receiving end device 220 can be two-way communication.

Therefore, in the data transmission method of the embodiments of the present disclosure, after the short-range wireless communication that is interrupted between the sending end device and the receiving end device is restored, the sending end device queries the recorded transmission information and continuous sending the data block, transmission of which is not completed, in the data to be transmitted, such that breakpoint continuous transmission can be realized between the sending end device and the receiving end device.

Figure 4:
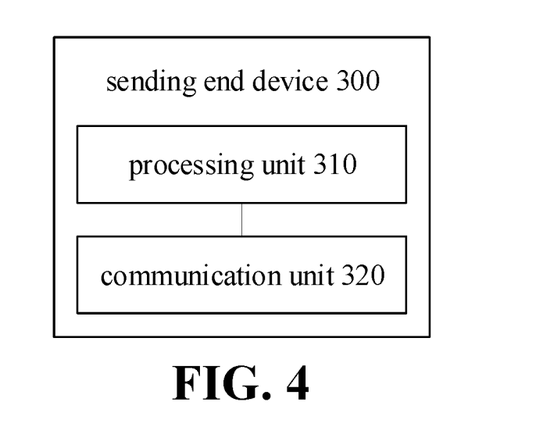
FIG. 4 is a schematic block diagram of a sending end device according to embodiments of the present disclosure.

FIG. 4 is a schematic block diagram of a sending end device 300 according to embodiments of the present disclosure. The sending end device 300 is applied to the short-range wireless communication based on the high carrier frequency, in the process that the sending end device 300 sends the data to be transmitted to the receiving end device through the short-range wireless communication. The sending end device 300 includes a processing unit 310 and a communication unit 320.

The processing unit 310 is configured to query recorded transmission information after the short-range wireless communication that is interrupted between the sending end device and the receiving end device is restored, where the transmission information is used to indicate a data block, transmission of which is not completed, in the data to be transmitted.

The communication unit 320 is configured to transmit, to the receiving end device, the data block, transmission of which is not completed, in the data to be transmitted.

In some embodiments, the communication unit 320 is further configured to wirelessly charge the receiving end device in a process of the short-range wireless communication between the sending end device and the receiving end device.

In some embodiments, the sending end device 300 includes an IC chip that is internally packaged with an EHF antenna.

In some embodiments, the processing unit 310 is further configured to divide the data to be transmitted into data blocks.

In some embodiments, the processing unit 310 is specifically configured to divide the data to be transmitted into a plurality of data blocks according to a wireless transmission rate, so that the transmission duration of each data block is less than or equal to a preset duration.

In some embodiments, the preset duration is 1 s.

In some embodiments, the processing unit 310 is specifically configured to query the recorded transmission information according to the recording table, in which the recording table includes a data block, transmission of which is not completed, in the data to be transmitted and/or a data block, transmission of which is completed, in the data to be transmitted.

In some embodiments, the high carrier frequency is 60 GHz.

It should be understood that the sending end device 300 may correspond to the sending end device in the method 200, and can implement the corresponding operations implemented by the sending end device in the method 200, which is not elaborated here for brevity.

Figure 5:
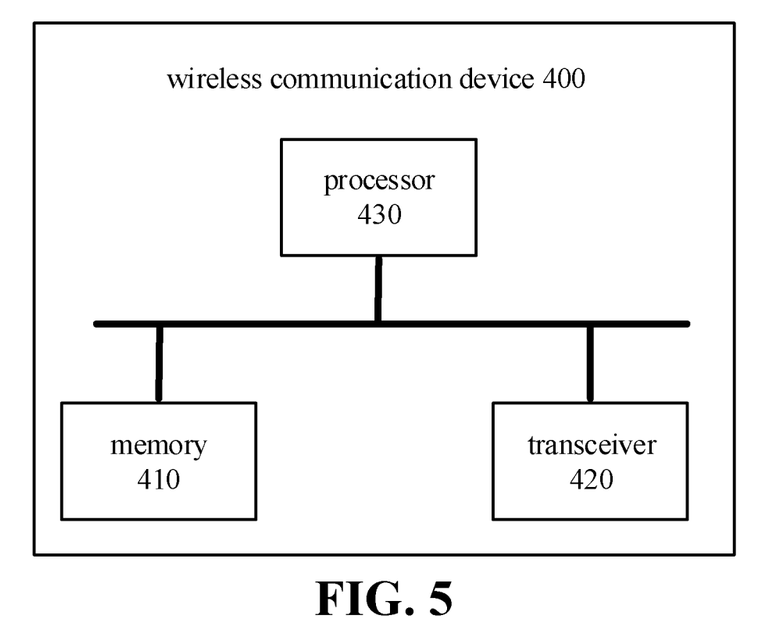
FIG. 5 is a schematic block diagram of a wireless communication device according to embodiments of the present disclosure.

FIG. 5 is a schematic block diagram of a wireless communication device 400 provided by embodiments of the present disclosure. The device 400 includes a memory 410, a transceiver 420, and a processor 430.

The memory 410 is configured to store a program, where the program includes codes.

The transceiver 420 is configured to communicate with other devices.

The processor 430 is configured to execute the program codes in the memory 410.

In some embodiments, the transceiver 420 is configured to perform specific signal receiving and transmitting under the driving of the processor 430.

When the codes are executed, the processor 430 can implement various operations performed by the sending end device in the method 200 illustrated in FIG. 2, which is not elaborated here for brevity. In this case, the device 400 may be a sending end device, such as a mobile phone.

It should be understood that, in embodiments of the present disclosure, the processor 430 may be a central processing unit (CPU), and the processor 430 may also be other general-purpose processor, digital signal processor (DSP), application specific integrated circuits (ASIC), field programmable gate array (FPGA) or other programmable logic device, discrete gate or transistor logic device, discrete hardware component, and the like. The general-purpose processor may be a microprocessor or the processor may be any conventional processor or the like.

The memory 410 may include the read only memory and the random access memory and provides instructions and data to the processor 430. A portion of the memory 410 may also include a non-volatile random access memory. For example, the memory 410 may also store information of device type.

The transceiver 420 may be an IC chip internally packaged with an EHF antenna for high speed data transmission.

In an implementation process, at least one step of the above method may be performed by an integrated logic circuit of hardware in the processor 430, or the integrated logic circuit may perform the at least one step under driving of instructions in a form of software. Thus, the wireless communication device 400 may be a chip or chipset. The steps of the method disclosed in the embodiments of the present disclosure may be directly embodied as being implemented by a hardware processor, or may be performed by a combination of hardware and software modules in the processor. The software module can be located in a storage medium well known in the art, such as random access memory, flash memory, read only memory, programmable read only memory or electrically erasable programmable memory, register, and the like. The storage medium is located in the memory, and the processor 430 reads the information in the memory and completes the steps of the above method in combination with the hardware thereof. To avoid repetition, details will not be elaborated here.

Figure 6:
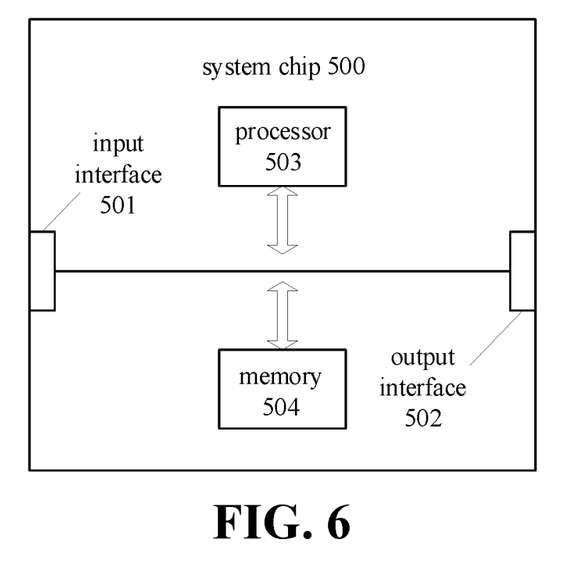
FIG. 6 is a schematic diagram of a system chip according to embodiments of the present disclosure.

FIG. 6 is a schematic block diagram of a system chip 500 according to embodiments of the present disclosure. The system chip 500 of FIG. 6 includes an input interface 501, an output interface 502, a processor 503, and a memory 504 that can be coupled via an internal communication connection line. The processor 503 is configured to execute codes in the memory 504.

When the codes are executed, the processor 503 implements the method performed by the sending end device in the method embodiments. For the sake of brevity, details will not be elaborated here.

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions are generated in whole or in part as described according to embodiments of the present disclosure. The computer may be a general-purpose computer, a special purpose computer, a computer network, or other programmable device. The computer instructions may be stored in a computer readable storage medium or transferred from one computer readable storage medium to another computer readable storage medium, for example, the computer instructions may be transferred from a website site, computer, server or data center to another website site, computer, server or data center in a wired manner (for example, via coaxial cable, fiber optic, digital subscriber line (DSL)) or in a wireless manner (for example, via infrared, wireless, microwave, etc.). The computer readable storage medium may be any available media that can be accessed by a computer or a data storage device such as a server, data center, or the like that includes one or more available mediums. The available medium may be a magnetic medium (e.g., a floppy disk, a hard disk, a magnetic tape), an optical medium (e.g., a DVD), or a semiconductor medium (e.g., a solid state disk (SSD)).

It should be understood that, in various embodiments of the present disclosure, the value of the sequence numbers of the foregoing processes does not mean the order of execution sequence, and the order of execution of respective processes should be determined by their functions and internal logic, and shall not constitute any limitation on the implementation process of embodiments of the present disclosure.

It should be understood that terms "system" and "network" are used interchangeably throughout this application. The term "and/or" in the present disclosure is merely an association relationship describing the associated objects, indicating that there may be three relationships, for example, A and/or B may indicate three circumstances that are A exists only, A and B exist simultaneously, B exists only. In addition, the character "/" in this article generally indicates that there is an "or" relationship between the front and back associated objects.

A person skilled in the art can clearly understand that, for the convenience and brevity of the description, with respect to the specific working process of the system, the device and the unit described above, reference can be made to the corresponding process in the foregoing method embodiment, and details are not described herein again.

The foregoing is only a specific embodiment of the present disclosure, but the protection scope of the present disclosure is not limited thereto, and any person skilled in the art can easily think of changes or substitutions within the technical scope disclosed in the present disclosure, which shall be covered by the protections cope of the present disclosure. Therefore, the protection scope of the present invention shall be subject to the protection scope defined by the claims.

What is claimed is:

1. A method for data transmission, wherein the method is applied to short-range wireless communication based on a high carrier frequency, during a process of a sending end device sending data to be transmitted to a receiving end device, the method comprises:
    after short-range wireless communication interrupted between the sending end device and the receiving end device is restored, the sending end device querying recorded transmission information, wherein the recorded transmission information is used to indicate a data block, transmission of which is not completed, in the data to be transmitted;
    the sending end device sending, to the receiving end device, the data block, transmission of which is not completed, in the data to be transmitted; and
    the sending end device dividing the data to be transmitted into a plurality of data blocks according to a wireless transmission rate, such that a transmission duration of each data block is less than or equal to a preset duration.

2. The method according to claim 1, further comprising:
    the sending end device wirelessly charging the receiving end device during the short-range wireless communication between the sending end device and the receiving end device.

3. The method according to claim 1, wherein the sending end device comprises an IC chip internally packaged with an extremely high frequency EHF antenna.

4. The method according to claim 1, wherein the preset duration is 1 s.

5. The method according to claim 1, wherein the sending end device querying the recorded transmission information comprises:
    the sending end device querying the recorded transmission information according to a recording table, the recording table comprising a data block, transmission of which is not completed, in at least one of the data to be transmitted and a data block that has been completely transmitted in the data to be transmitted.

6. The method according to claim 1, wherein the high carrier frequency is 60 GHz.

7. A sending end device, wherein the sending end device is applied to short-range wireless communication based on a high carrier frequency, during a process of the sending end device sending data to be transmitted to a receiving end device, the sending end device comprising:
    a communication interface;
    a memory, configured to store instructions; and
    a processor, coupled to the communication interface and the memory, and configured to run a program corresponding to the instructions by reading the instructions stored in the memory, so as to:
        query recorded transmission information after short-range wireless communication interrupted between the sending end device and the receiving end device is restored, wherein the recorded transmission information is used to indicate a data block, transmission of which is not completed, in the data to be transmitted;
        send, to the receiving end device, the data block, transmission of which is not completed, in the data to be transmitted;
        divide the data to be transmitted into a plurality of data blocks according to a wireless transmission rate, such that a transmission duration of each data block is less than or equal to a preset duration.

8. The sending end device according to claim 7, wherein the processor is further configured to wirelessly charge the receiving end device during the process of the sending end device sending data to be transmitted to the receiving end device.

9. The sending end device according to claim 7, wherein the sending end device comprises an IC chip internally packaged with an extremely high frequency EHF antenna.

10. The sending end device according to claim 7, wherein the preset duration is 1 s.

11. The sending end device according to claim 7, wherein the processor is configured to:
    query the recorded transmission information according to a recording table, the recording table comprising a data block, transmission of which is not completed, in the data to be transmitted and/or a data block that has been completely transmitted in the data to be transmitted.

12. The sending end device according to claim 7, wherein the high carrier frequency is 60 GHz.

13. The sending end device according to claim 7, wherein the sending end device is a wireless charging base.

14. A system for short-range wireless communication, comprising a sending end device and a receiving end device, wherein
    the sending end device and the receiving end device are configured to establish short-range wireless communication based on a higher carrier frequency;
    the sending end device is configured to query recorded transmission information after the short-range wireless communication interrupted between the sending end device and the receiving end device is restored, in which the recorded transmission information is used to indicate a data block, transmission of which is not completed, in the data to be transmitted;
    the sending end device is further configured to send, to the receiving end device, the data block, transmission of which is not completed, in the data to be transmitted; and the sending end device is further configured to divide the data to be transmitted into a plurality of data blocks according to a wireless transmission rate, such that a transmission duration of each data block is less than or equal to a preset duration.

15. The system according to claim 14, wherein the sending end device is further configured to determine whether transmission of the data to be transmitted is not completed before querying the recorded transmission information and to query the recorded transmission information when determining that the transmission of the data to be transmitted is not completed.

16. The system according to claim 15, wherein the sending end device is configured to determine whether transmission of the data to be transmitted is not completed by:

determining whether there is transmission information corresponding to an identifier of the receiving end device; or determining whether there is feedback message fed back by the receiving end device, in which the feedback message is configured to indicate that the transmission of the data to be transmitted is not completed; or determining whether there is indication information, in which the indication information is configured to indicate that the sending end device fails to send the data to be transmitted.

* * * * *